(12) United States Patent
O'Donnell et al.

(10) Patent No.: US 10,716,288 B2
(45) Date of Patent: Jul. 21, 2020

(54) ANIMAL FOOD DISPENSER

(71) Applicant: Clear-Coat Holding Company, Philadelphia, PA (US)

(72) Inventors: Dennis P. O'Donnell, Philadelphia, PA (US); Eric Griffin, Philadelphia, PA (US); Keith Hatton, Philadelphia, PA (US); John Combs, Philadelphia, PA (US); Kurt Swanson, Philadelphia, PA (US); Devin Sidell, Philadelphia, PA (US)

(73) Assignee: CURIO HOLDING COMPANY, Philadelphia, PA (US)

( * ) Notice: Subject to any disclaimer, the term of this patent is extended or adjusted under 35 U.S.C. 154(b) by 402 days.

(21) Appl. No.: 15/267,348

(22) Filed: Sep. 16, 2016

(65) Prior Publication Data

US 2017/0127648 A1    May 11, 2017

Related U.S. Application Data

(60) Provisional application No. 62/253,882, filed on Nov. 11, 2015.

(51) Int. Cl.
*A01K 5/01* (2006.01)
*A01K 15/02* (2006.01)

(52) U.S. Cl.
CPC .......... *A01K 5/0114* (2013.01); *A01K 15/025* (2013.01)

(58) Field of Classification Search
CPC ............................ A01K 5/0114; A01K 15/025
USPC .... 119/61.5, 61.53, 61.55, 61.2, 61.1, 61.54, 119/707
See application file for complete search history.

(56) References Cited

U.S. PATENT DOCUMENTS

| | | | |
|---|---|---|---|
| 1,289,681 A | 12/1918 | Curtis | A63F 7/044 |
| | | | 273/116 |
| 2,034,478 A * | 3/1936 | Levy | A47G 23/06 |
| | | | 62/457.6 |
| 3,170,875 A * | 2/1965 | Swett | A47J 43/24 |
| | | | 209/274 |
| 3,589,340 A * | 6/1971 | Beliles | A01K 5/01 |
| | | | 119/61.54 |
| D221,099 S | 7/1971 | Alparone | |
| 3,648,403 A | 3/1972 | Gommel | A63F 9/0415 |
| | | | 119/707 |

(Continued)

OTHER PUBLICATIONS

Lore I. Haug, DVM, "Environmental Enrichment for Dogs"; Texas Veterinary Behavior Services; 2006.

(Continued)

*Primary Examiner* — Ebony E Evans
(74) *Attorney, Agent, or Firm* — The Belles Group, P.C.

(57) ABSTRACT

An enrichment device for dispensing edible food products to an animal, and including the capability to provide the animals meal with said device. The device includes a body, an upper surface which preferably is removable from the body, a cavity, at least one passageway in the upper surface, the passageway communicating with the cavity to allow food to pass from the upper surface into the cavity. The body has a wall forming the cavity, and the wall has one or more openings therein to allow for food to pass from the cavity outside of the device where it may be consumed by the animal. The device bottom is configured to provide a rocking motion when the device is disrupted.

39 Claims, 13 Drawing Sheets

(56) References Cited

U.S. PATENT DOCUMENTS

| | | | |
|---|---|---|---|
| D262,069 S | 11/1981 | Khider | |
| 4,303,170 A | 12/1981 | Panicci | A47G 19/2261 215/376 |
| D296,020 S | 5/1988 | McCarroll | |
| 4,752,147 A * | 6/1988 | Persi | B05C 17/00 401/123 |
| D304,536 S | 11/1989 | Blaser | D7/584 |
| 5,009,193 A | 4/1991 | Gordon | A01K 15/025 119/707 |
| 5,169,023 A | 12/1992 | Heiberg | A47J 27/002 220/254.7 |
| D353,080 S * | 12/1994 | Cantereels | D7/667 |
| 5,377,621 A * | 1/1995 | Camm | A01K 5/0114 119/61.54 |
| D357,588 S | 4/1995 | Fachinger | D6/302 |
| D360,304 S | 7/1995 | Fachinger | D6/302 |
| 5,791,287 A | 8/1998 | Gruber | A01K 7/005 119/61.54 |
| D424,758 S | 5/2000 | Akopdjanov | D30/129 |
| 6,098,571 A | 8/2000 | Axelrod et al. | |
| 6,112,698 A | 9/2000 | Zelinger | A01K 5/0135 119/61.54 |
| 6,167,841 B1 * | 1/2001 | Ho | A01K 15/025 119/61.54 |
| D440,736 S | 4/2001 | Stafford | D1/107 |
| D447,074 S | 8/2001 | Chan | D10/104.1 |
| 6,341,578 B1 | 1/2002 | Berube | A01K 1/0121 119/162 |
| 6,349,671 B1 | 2/2002 | Lewis | A01K 5/0291 119/51.02 |
| 6,431,389 B1 | 8/2002 | Jerstroem | A47J 36/02 220/574 |
| D490,577 S | 5/2004 | Steinbacher et al. | |
| D492,539 S | 7/2004 | Henry | D7/357 |
| 6,945,195 B1 | 9/2005 | Morrison | A01K 15/025 119/707 |
| 7,207,291 B1 | 4/2007 | Watts | A01K 5/0114 119/61.5 |
| D553,305 S | 10/2007 | Willinger | D30/133 |
| D560,862 S | 1/2008 | Knuth | D30/155 |
| D561,411 S | 2/2008 | Pipenur | D30/155 |
| D563,608 S | 3/2008 | Kitchen | |
| D571,929 S | 6/2008 | Palmer, III | D25/2 |
| D576,735 S | 9/2008 | Strickler | D23/261 |
| 7,441,514 B2 | 10/2008 | Dana | |
| D589,660 S | 3/2009 | Tolentino-Swem | D30/153 |
| D606,278 S | 12/2009 | Kerr | D1/107 |
| 7,753,000 B1 * | 7/2010 | Turner | A01K 5/01 119/57 |
| D622,028 S | 8/2010 | Kerr | D1/107 |
| 7,856,944 B1 | 12/2010 | Stauffer | A01K 5/0114 119/61.5 |
| D636,944 S | 4/2011 | Anderson et al. | |
| D640,564 S | 6/2011 | Kerr | D9/607 |
| D642,336 S | 7/2011 | Desrosiers | D30/122 |
| D648,904 S | 11/2011 | Tedaldi et al. | |
| D650,147 S | 12/2011 | Kerr | D1/106 |
| 8,083,090 B2 * | 12/2011 | Cocchiarella | A47G 19/02 220/521 |
| D656,280 S | 3/2012 | St. Clair | D30/122 |
| D659,296 S | 5/2012 | Anderson | |
| 8,230,808 B2 * | 7/2012 | Lai | A01K 5/0225 119/51.01 |
| D665,000 S | 8/2012 | Morelli | D15/90 |
| D665,133 S | 8/2012 | Haverstock | D30/129 |
| D665,264 S | 8/2012 | Kerr | D9/607 |
| D667,034 S | 9/2012 | Wirth, Jr. | D15/140 |
| 8,342,128 B2 * | 1/2013 | Rocker | A01K 5/01 119/61.2 |
| D676,202 S | 2/2013 | Hansen | D30/121 |
| D676,619 S | 2/2013 | Hansen | D30/121 |
| 8,381,684 B2 * | 2/2013 | Crawford | A01K 5/0114 119/61.1 |
| D684,733 S | 6/2013 | Altoon | D30/161 |
| D685,565 S | 7/2013 | Bhandula | D99/1 |
| D687,616 S | 8/2013 | Smith | D1/107 |
| D689,328 S | 9/2013 | Hollinger | D7/354 |
| D693,862 S | 11/2013 | Wirth, Jr. | D15/140 |
| D697,687 S | 1/2014 | Kerr | D1/107 |
| D697,691 S | 1/2014 | Kerr | D1/199 |
| D697,692 S | 1/2014 | Kerr | D1/106 |
| 8,631,763 B2 | 1/2014 | Lipscomb | A01K 5/0142 119/54 |
| D699,009 S | 2/2014 | Hansen et al. | |
| 8,640,647 B2 | 2/2014 | Dotterer | |
| 8,651,055 B2 * | 2/2014 | Dreger | A01K 5/0135 119/61.5 |
| D701,732 S * | 4/2014 | Ehrenhaus | D7/539 |
| 8,869,748 B2 | 10/2014 | Yin | A01K 15/021 119/51.02 |
| D721,860 S | 1/2015 | Parks | D30/129 |
| D725,317 S | 3/2015 | Avalos Sartorio | D30/121 |
| D741,024 S | 10/2015 | Liu | D30/129 |
| D757,374 S | 5/2016 | Breit | D30/133 |
| D775,769 S | 1/2017 | Trottier | D30/122 |
| D776,368 S | 1/2017 | Avalos Sartorio | D30/118 |
| 9,591,832 B2 | 3/2017 | Price | A01K 15/025 |
| D793,630 S | 8/2017 | Bales | D30/121 |
| 9,737,049 B2 | 8/2017 | Trottier | A01K 5/02 |
| D805,700 S | 12/2017 | Owens, III | D30/129 |
| 9,872,479 B2 * | 1/2018 | Tharp | A01K 5/0114 |
| D819,278 S | 5/2018 | Watanabe | D30/129 |
| D819,901 S | 6/2018 | Bone | D30/199 |
| D822,312 S | 7/2018 | Williams | D1/107 |
| D822,922 S | 7/2018 | Wen | D30/199 |
| D824,602 S | 7/2018 | Danenberg et al. | |
| D821,039 S | 8/2018 | Owens, III | D30/129 |
| D825,865 S | 8/2018 | Abbey | D53/129 |
| D830,007 S | 10/2018 | Harris | |
| D832,529 S | 10/2018 | Elliott | |
| D836,852 S | 12/2018 | Abbott | |
| 2003/0070956 A1 | 4/2003 | Schiltz | B65D 1/36 206/515 |
| 2004/0200845 A1 * | 10/2004 | Watzke | B65D 1/24 220/501 |
| 2005/0235919 A1 | 10/2005 | Willinger | A01K 5/0114 119/61.5 |
| 2005/0268862 A1 | 12/2005 | Morrison | A01K 15/025 119/707 |
| 2006/0207993 A1 | 9/2006 | Copeland | A47G 19/02 220/574 |
| 2007/0199512 A1 | 8/2007 | Ellis | A01K 7/005 119/61.54 |
| 2008/0083378 A1 * | 4/2008 | Pearce | A01K 5/0114 119/707 |
| 2009/0199774 A1 | 8/2009 | Hamilton | A01K 5/01 119/61.54 |
| 2010/0077963 A1 | 4/2010 | Lipscomb | A01K 5/0114 119/54 |
| 2011/0132269 A1 | 6/2011 | Davidson | A45C 11/00 119/161 |
| 2011/0169183 A1 | 7/2011 | Axelrod | B29C 45/14778 264/46.4 |
| 2011/0226187 A1 * | 9/2011 | Bertsch | A01K 5/0114 119/61.55 |
| 2012/0017837 A1 | 1/2012 | Crawford | A01K 5/01 119/61.1 |
| 2012/0068396 A1 | 3/2012 | Wirth, Jr. | B23Q 1/032 269/289 R |
| 2012/0204799 A1 * | 8/2012 | Desrosiers | A01K 5/0114 119/61.54 |
| 2013/0104808 A1 | 5/2013 | Rocker | A01K 5/0128 119/61.55 |
| 2013/0228128 A1 | 9/2013 | Schehr | A01K 5/01 119/61.5 |
| 2013/0276711 A1 * | 10/2013 | Lipscomb | A01K 5/0114 119/54 |

(56) References Cited

U.S. PATENT DOCUMENTS

| 2014/0158054 A1 | 6/2014 | Clarke ................. | A01K 5/0114 |
| | | | 119/51.01 |
| 2017/0127647 A1 | 5/2017 | Owens, III ........... | A01K 5/0114 |
| 2017/0127648 A1 | 5/2017 | O'Donnell ........... | A01K 5/0114 |

OTHER PUBLICATIONS

Haug, Lore I., DVM, "Texas Veterinary Behavior Services", pp. 1-2, 2006.
Huag, Lore I., *Texas Veterinary Behavior Services—Environmental Enrichment for Dogs* , DVM, 2006, pp. 1-2.

\* cited by examiner

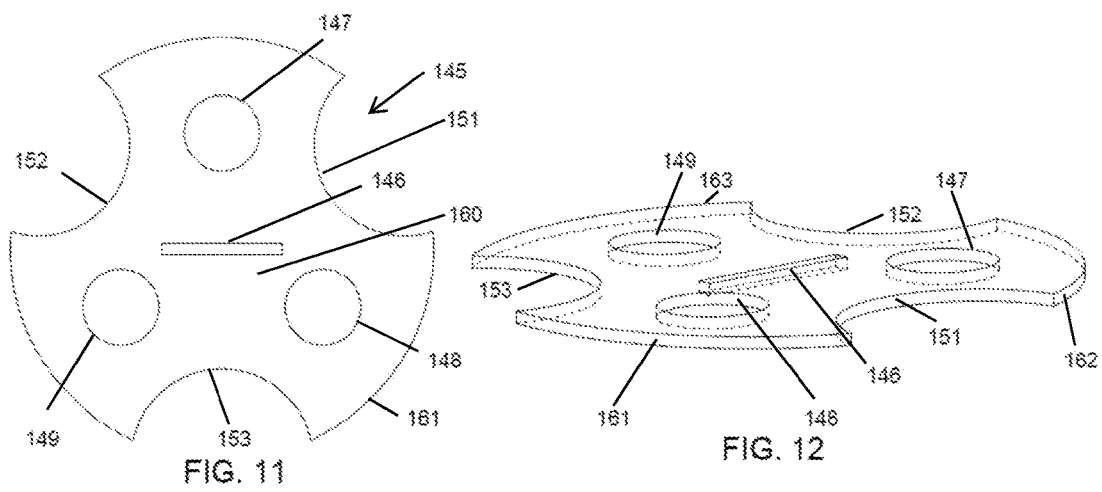
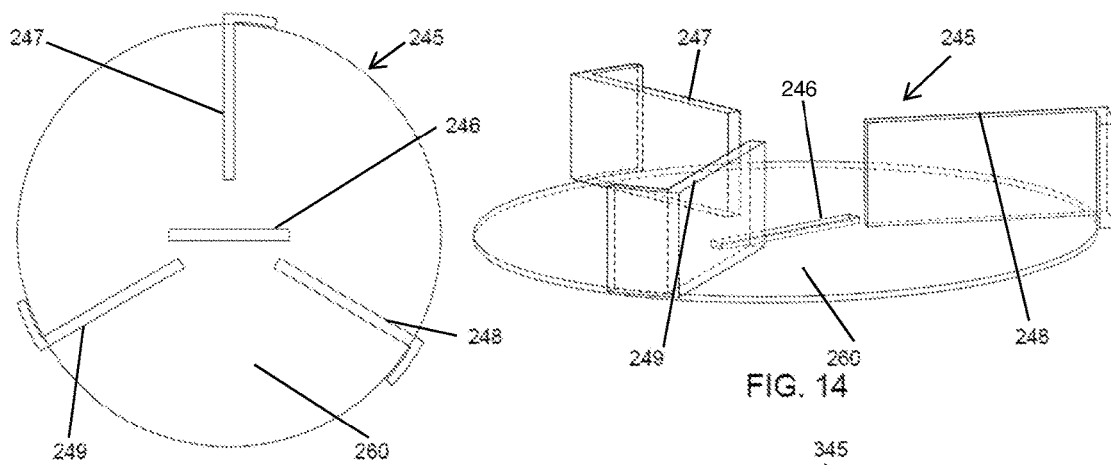
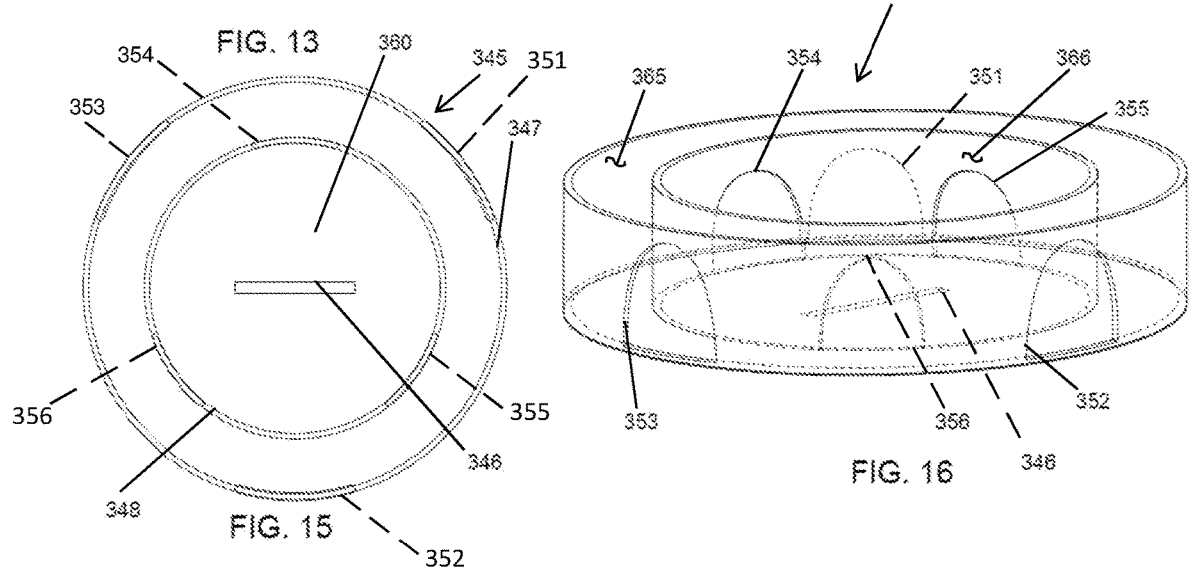

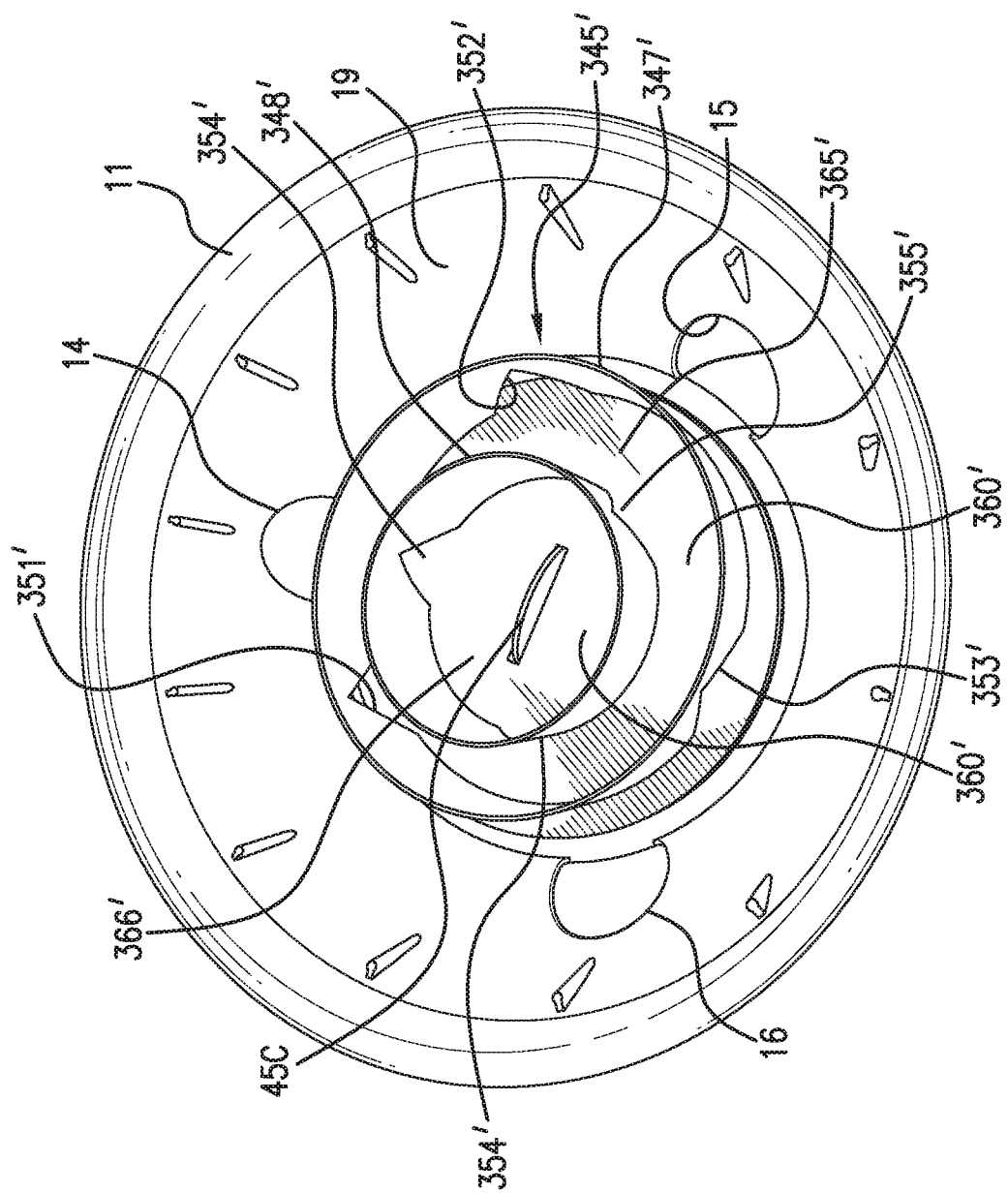

ANIMAL FOOD DISPENSER

CROSS-REFERENCE TO RELATED APPLICATIONS

This patent application claims the benefit under 35 U.S.C. 119 and 35 U.S.C. 120 of U.S. provisional application Ser. No. 62/253,882 entitled "Enrichment Device for an Animal", filed Nov. 11, 2015, the complete contents of which is herein incorporated by reference.

BACKGROUND OF THE INVENTION

1. Field of the Invention

The invention relates to devices for animals, and in particular, devices for animals that involve feeding and playing, and more particularly a feeding bowl for an animal, such as a dog.

2. Brief Description of the Related Art

A number of bowls are produced in the marketplace for feeding pets. Typically, pet bowls are made of a durable material that can be formed into the bowl to hold wet and dry food, and that may be washed with detergents or in a dish washing machine. Pets engage in eating, which usually does not demand much time. There are a number of toys made for use by animals, most commonly for domestic animals, such as dogs and cats. The toys are intended for play, and to provide some form of activity for an animal. Toys are also provided for other domestic animals, as well as even for non-domestic animals in captivity, such as animals kept in zoos or shelters. Typically domestic animals served a function, herding sheep, or other tasks on a farm. The animal's time became occupied with activity. In the case of non-domestic animals, typically most of their time is spent foraging for food. Stimulation of animals kept as pets in the home, or in shelters or other controlled environments, has been attempted to reduce boredom, and undesirable behavior that may result as a consequence of the animal needing to be active. A number of toys are produced and sold which are intended to occupy the animal by providing an activity that will engage the animal Some toys have sound, clicking, lights or other responsive components. A number of different sizes and shapes of toys are available. There are also products which have been designed to require engagement of the animal in order to obtain food. These products typically are referred to as enrichment products. A typical enrichment device captivates food and limits its distribution to the animal by requiring the animal to perform one or more tasks. The enrichment devices often take time to fill, requiring the owner or handler to insert food into small spaces or into multiple compartments. One example of an enrichment product involves a ball filled with food that is placed into a tube. The animal must reach into the tube and move the ball to release food from an opening in the ball. The ball remains captive in the tube and may be removed and refilled as needed by a caretaker of the animal Refilling the device requires that the ball be unsecured, removed from the device tube, refilled, placed back into the tube, and then finally re-secured within the tube. Another example of an enrichment device is a bowl having protrusions, such as posts or grooves provided in the bottom surface. The food is placed into the bowl and occupies the grooves, or, in the case of an obstruction, such as a post, fills in around the post. The pet must move the food around the obstruction or post in order for the food to be accessible to the pet for consumption. In the case of the grooved device, grooves are formed which lead to spaces or terminations in which the food may pool or pile up for ease of access, so that the animal is encouraged to move the food along the groove to a location at which the animal may pick up the food.

As mentioned, animals when not engaged will often become bored. Domestic animals are typically kept in an environment which is the same day in and day out. Although dogs may be taken for a walk, a dog in the home, even if taken for an hour walk per day, may not have the stimulation that it needs. In addition, a number of dogs, such as for example, police service dogs and dogs kept in shelters, are often confined to cages for extended periods of time. These animals become bored, and often there is little or no stimulation for the animal. When animals are young, particularly dogs at the puppy stage, they typically will occupy themselves with a variety of activities, some of which may be destructive to the environment around them. The young canine may chew on furniture, rip pillows, or damage shoes and other household articles. Aside from the damage done to the articles, this behavior also may be hazardous to the pet. When the pet is occupied with another activity, such as eating or playing with an appropriate toy, then the pet is less likely to engage in destruction or harmful conduct. In addition, dogs that may be confined to a cage or other area also may benefit from engaging in a stimulating activity. A variety of puzzle type toys for pets have been produced, some requiring action on the part of the pet in order to obtain a treat. However, the pet often becomes bored and does not resume the activity, or is occupied for a limited amount of time.

SUMMARY OF THE INVENTION

An animal enrichment device is provided for providing an animal with access to a nutritional meal and engaging the animal in an activity while the animal consumes the meal. According to a preferred embodiment, the enrichment device is configured as a food bowl that can contain the entire allotment of food for an animal. The food bowl is designed so that it may be used in place of the animal's current food bowl, or purchased as an alternative to pet feed bowls currently offered.

The enrichment device, or bowl, provides a meal for the animal, which preferably may be the animal's entire meal or meal allotment (e.g., the entire meal portion for that feeding). According to a preferred embodiment, the device is configured to hold food and has a compartment into which portions of the animal's food (i.e., its meal) may fall or otherwise pass.

According to preferred embodiments, the device is configured as a food bowl and may provide food for a dog, including the dog's entire meal, which, for example, may be up to about 4 cups of food. Therefore, another advantage of the device is that, according to preferred embodiments, the food bowl has the ability to hold an entire meal for the pet, and the food may be placed in a single area of the device. Preferably, the area in which food may be placed is open for ease in placing it.

According to some preferred embodiments, the device is provided so as to not require any assembly, disassembly, or reconfiguration to fill or load with food. The device may be washed, including in a dishwasher with other household tableware items, and reused.

Embodiments of the device provide a cavity with a passageway therein. Food or treats are loaded into the cavity space, and the device is placed on a supporting surface (e.g., a floor). When the device is disrupted, for example, by an animal engaging the device, the device releases a treat or food that has been loaded into the cavity. At least a portion of the device, and preferably an outer surface portion, is shaped to displace the device when the device is disrupted. The displacement may be movement such as tipping, rocking, swaying, rotating, tumbling, or the like. The device preferably is supported on a support surface, and the portion or portions shaped to encourage displacement of the device may be supported on the support surface (and, in some instances, may alternate between engagement with a support surface, such as a floor, as the device is moved).

Embodiments of the device are configured to hold and dispense edible materials, such as food, to an animal. The device may be used with pets (as well as other animals, e.g., non-domestic type zoo animals) and preferably provides the pet (or animal) with its entire meal (or meal portion or allotment). The device is configured so that the animal may receive food from a first location of the device, such as the top or open end of the device, and may receive food from a second location of the device, which preferably is from an internal device cavity. According to a preferred embodiment, the food at the open end of the device is held on a first surface, and when the animal engages in retrieving it, the movement or disruption of the animal's activity causes some of the food to fall through the upper food-supporting surface and into the device cavity. The cavity has passages in the device wall so that when the device is tipped or moved (typically, by rocking or tilting), food will be released from the cavity onto the floor (or surface on which the device is resting) where it is then accessible for consumption by the animal. The device preferably is configured to rock and right itself, so that when the animal plays with the device by moving it (e.g., tipping it, nudging it, pushing it, or other action) the device returns back to a righted position. The device bottom preferably is constructed to have a gripping surface, so that movement of the device by the animal results in tipping or rocking of the device, rather than sliding.

It is another object of the invention to provide an animal enrichment device that may be washed in a dishwasher.

It is another object of the invention to provide an animal enrichment device that is constructed from food grade and/or FDA compliant materials.

It is an object of the invention to provide an animal enrichment device that has a bottom portion that is constructed from a material that provides friction or gripping relative to a surface on which the device is placed.

It is another object of the invention to accomplish any of the above objects where the device has a bottom that provides the device with the ability to rock.

It is another object of the invention to accomplish any of the above objects where the device is configured to have a weight balance so as to be able to tilt and return to an upright or substantially upright position.

According to some embodiments, the device bottom may be constructed from any suitable grippy substance that is durable, washable and can withstand the use made by the device. Some examples of compositions from which the bottom may be constructed include thermoplastic elastomers. Other examples include a suitable rubber, silicone, urethane or other materials or combinations of these materials, having suitable gripping properties. Embodiments of the device may be constructed from or have a layer of a gripping component on the bottom. For example, the bottom grippy portion may be a layer of a suitable gripping material. The material preferably provides suitable friction for a variety of floor surfaces (such as, for example, on stone, tile, concrete, wood, vinyl and the like).

The device may be constructed from any suitable material. Preferred materials include rigid, structural plastic. According to preferred embodiments, the device bottom preferably is a tacky, grippy material. Preferably, devices according to the invention are constructed from a material or materials that can withstand contact with an animal's saliva and the food compositions, and which may be washed with suitable washing detergents and cleaners. According to some preferred embodiments, the device may be constructed from a plastic material. A number of suitable materials may be used to produce the device. Although any suitable material may be used to construct the device, some preferred examples are thermoplastic elastomers. Other examples include polypropylene, silicone materials, or other suitable material or combinations of material. For example, the device may be constructed from polypropylene and the bottom portion of the device may be constructed having a gripping portion made from another material that provides suitable gripping or friction with a surface on which the device is placed (such as a floor). Alternative embodiments of the device may be constructed from a material that provides gripping and may be used for the device bowl and other portions.

According to some preferred embodiments, the device upper surface is removable, and the upper surface may comprise one or more removable plates. The removable plate typically sits above the device internal cavity and with a portion of the device wall provides a bowl area into which food may be placed. The removable plates may be provided with different designs and features, such as, for example, a paw shape, a dog face (with different breeds), and other designs. The removable plate preferably includes one or more depressions into which food may collect, and one or more passages, such as apertures in the plate, through which the edible material, such as food, may pass. In some preferred embodiments, the apertures are provided in the depressions. When the animal is actively engaged in retrieving and eating food from the upper portion or open end of the device, some food will fall through the plate and collect within the device cavity.

According to some embodiments, devices may be configured with an interior provided to control the level of restriction of food passage through the device, from easy, where there is very little restriction, or difficult, where passage is highly restricted. A device may include a structure located in the cavity that controls the ease or difficulty with which the food may be released from the device during agitation or play by the animal seeking to retrieve the food. For example, according to some embodiments, the interior cavity may include elements that impede the passage of food through the bowl exits. These restrictive elements or structures may be provided as part of one or more of the components, such as, for example, the upper plate or the floor, or may connect with them. For example, restrictive elements may project from the upper surface or upper plate (into the cavity), or they may project from the floor (into the cavity), or both. According to some embodiments, the restrictive structure may comprise an inner tray or insert that may be removably provided. According to some embodiments, a plurality of different inner trays/inserts may be interchanged by installation and removal thereof to control the level of restriction (for example, with some of these restrictive components providing little or no restriction, and others having restrictions, e.g., such as elements that may impede the exit of the food from the device). Device components, including the upper plate, floors and restrictive elements, e.g., which may be provided on trays or inserts, preferably are washable, and dishwasher safe.

According to some embodiments, an inner tray may be a separate component or provided as part of the upper surface portion or floor insert.

According to preferred embodiments, the device preferably is configured so that the food falling through the device is a percentage of the food placed into the top of the device. Preferred embodiments of the device may be configured as a bowl, and provide an alternative to providing an animal's meal in a typical food bowl. The enrichment device may be washed and reused, as needed.

BRIEF DESCRIPTION OF THE DRAWING FIGURES

FIG. 11 is a top plan view of an insert for the device of FIG. 1.

FIG. 12 is a perspective view of the insert of FIG. 11, shown as viewed from above and from the front.

FIG. 13 is a top plan view of another embodiment of an insert for the device of FIG. 1.

FIG. 14 is a perspective view of the insert of FIG. 13, shown as viewed from above and from the front.

FIG. 15 is a top plan view of another embodiment of an insert for the device of FIG. 1.

FIG. 16 is a perspective view of the insert of FIG. 15, shown as viewed from above and from the front.

FIG. 18 is a perspective view looking down on the device from the top, showing the device of FIG. 1, with the upper plate removed, and being shown with another embodiment of an insert installed.

DETAILED DESCRIPTION OF THE PREFERRED EMBODIMENTS

Figure 1:
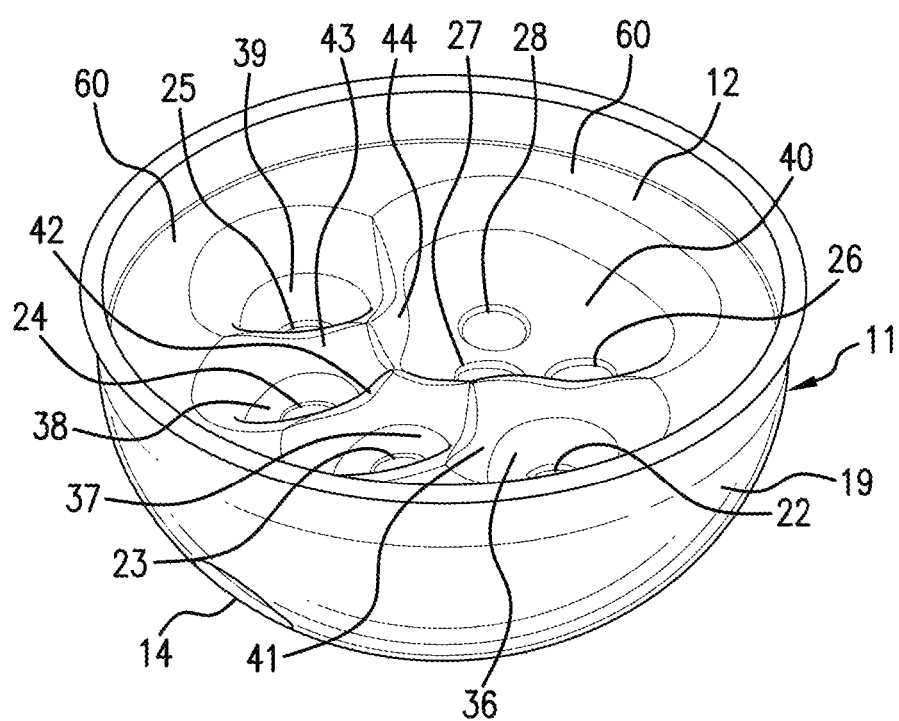
FIG. 1 is a perspective view showing an enrichment device according to a first embodiment of the invention.

Referring to the drawings, a preferred embodiment of and animal enrichment device 10 is illustrated in accordance with the invention. The device 10 is shown having a body 11 with an upper surface portion 12. A plurality of openings 14, 15, 16 (see FIG. 4) are disposed in the body 11. According to a preferred embodiment, the body 11 has a bottom 17 with a bottom configuration that enables the device 10 to rock or sway. According to the exemplary embodiment illustrated, the bottom portion 17 is shown having a rounded or semispherical contour. Alternatively, though not shown, the bottom may be constructed having another suitable configuration, such as, for example, rocking rails or the like, to provide the device with the ability to move, e.g., rock, tilt, and/or sway, and return to its upright or substantially upright positon.

Figure 2:
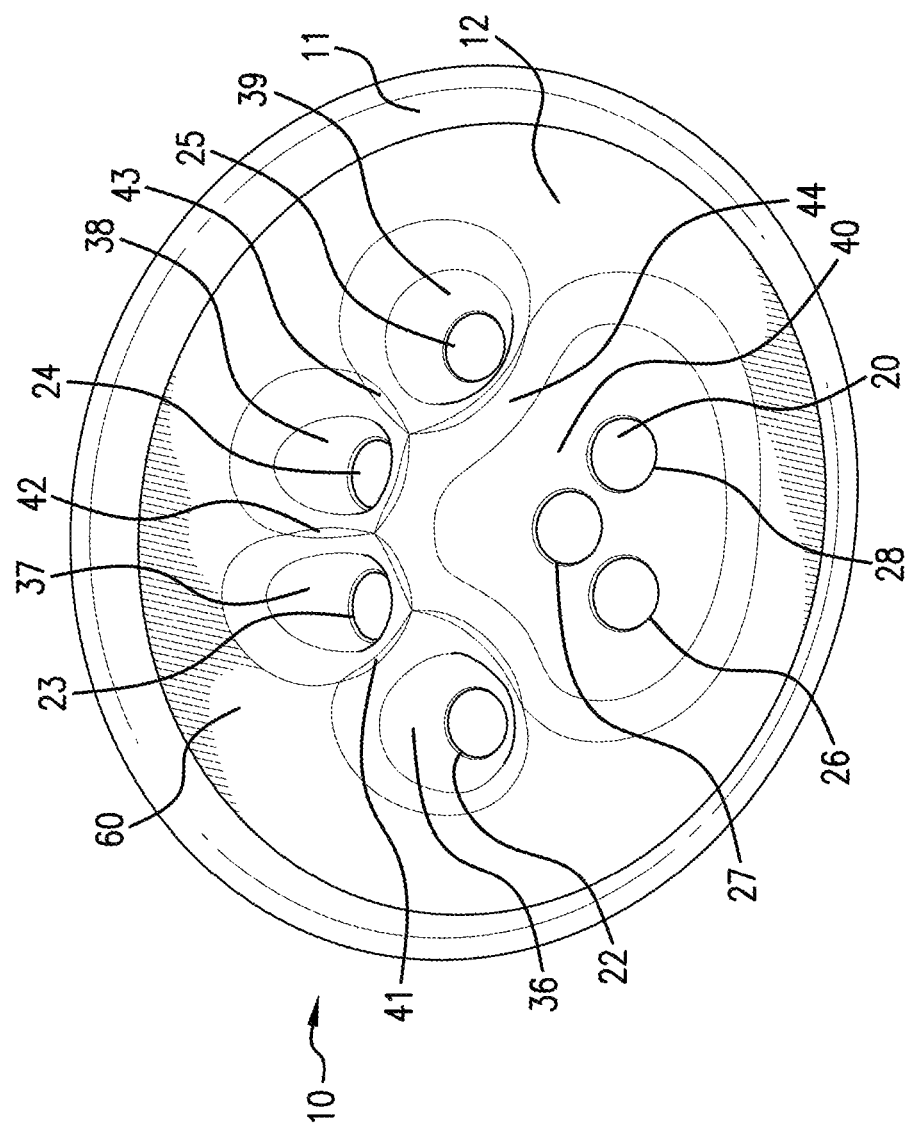
FIG. 2 is a top perspective view of the device of FIG. 1.
Figure 3:
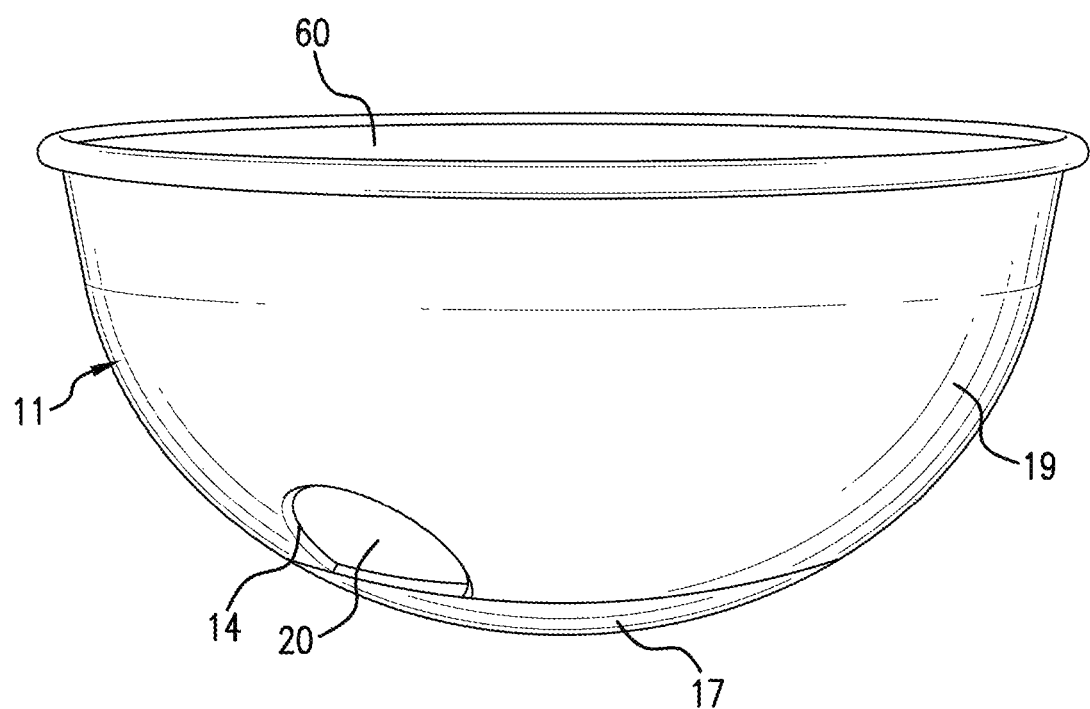
FIG. 3 is a side view of the device of FIG. 1, looking from the side.

The upper surface portion 12 preferably is raised from the lower portion of the device 10 to define a cavity 20 within the body 11. Referring to FIG. 2, the upper surface portion 12 also has one or more passageways leading into the cavity 20. According to the exemplary embodiment illustrated, passageways are depicted comprising apertures 22, 23, 24, 25, 26, 27, 28 provided in the upper surface portion 12. According to preferred embodiments, the upper surface portion 12 also may include undulations or raised portions and lowered portions, which, in the embodiment illustrated, form a configuration of an animal paw 35. The upper surface portion 12 is shown having a plurality of wells 36, 37, 38, 39, 40 separated by walls 41, 42, 43, 44. According to the preferred embodiment illustrated, apertures 22, 23, 24, 25, 26, 27, 28 preferably are provided in the lower portions, such as the wells 36, 37, 38, 39, 40, show formed in the upper surface portion 12.

Figure 5:
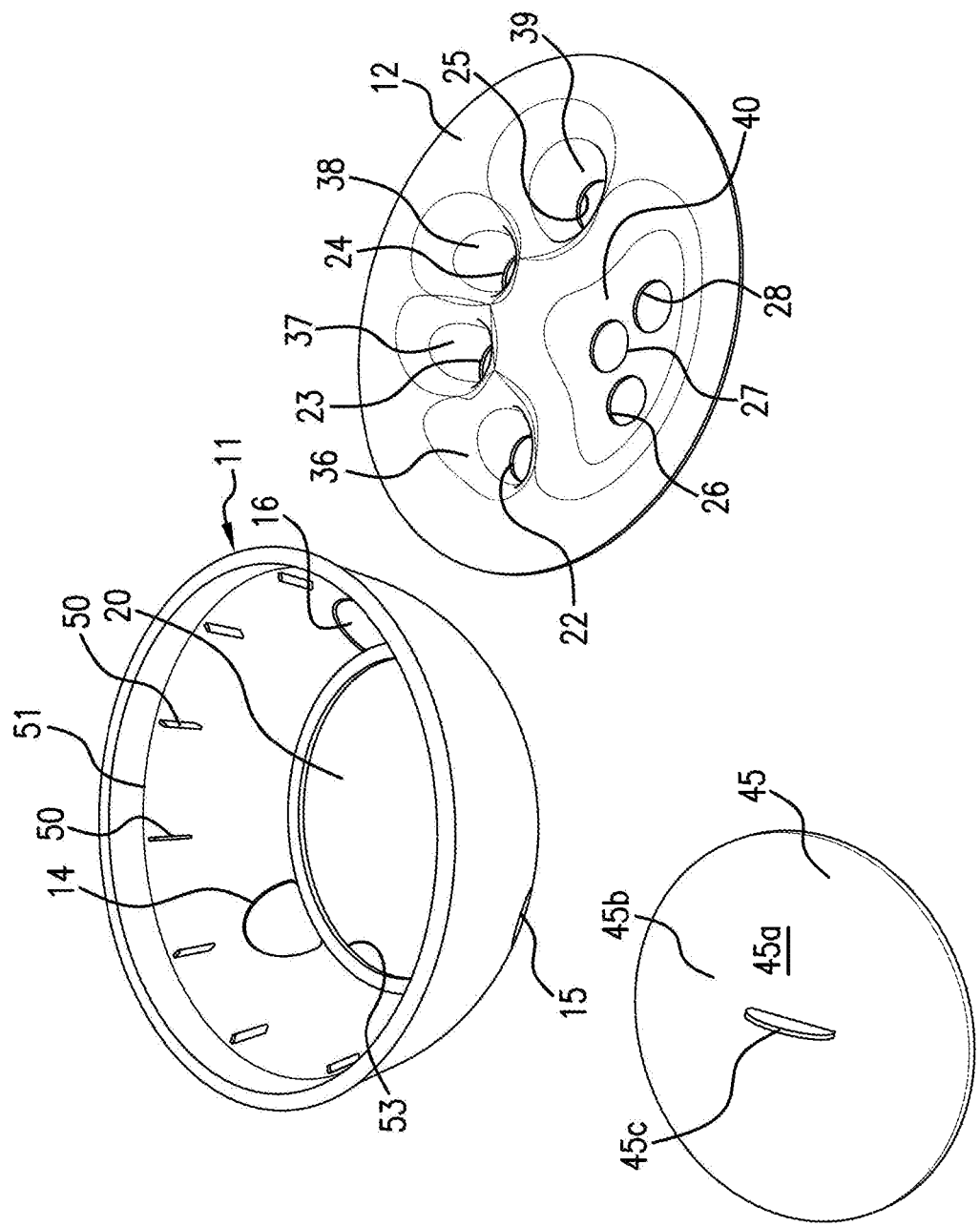
FIG. 5 is a perspective view of the device of FIG. 1, showing the components in an unassembled condition.
Figure 6:
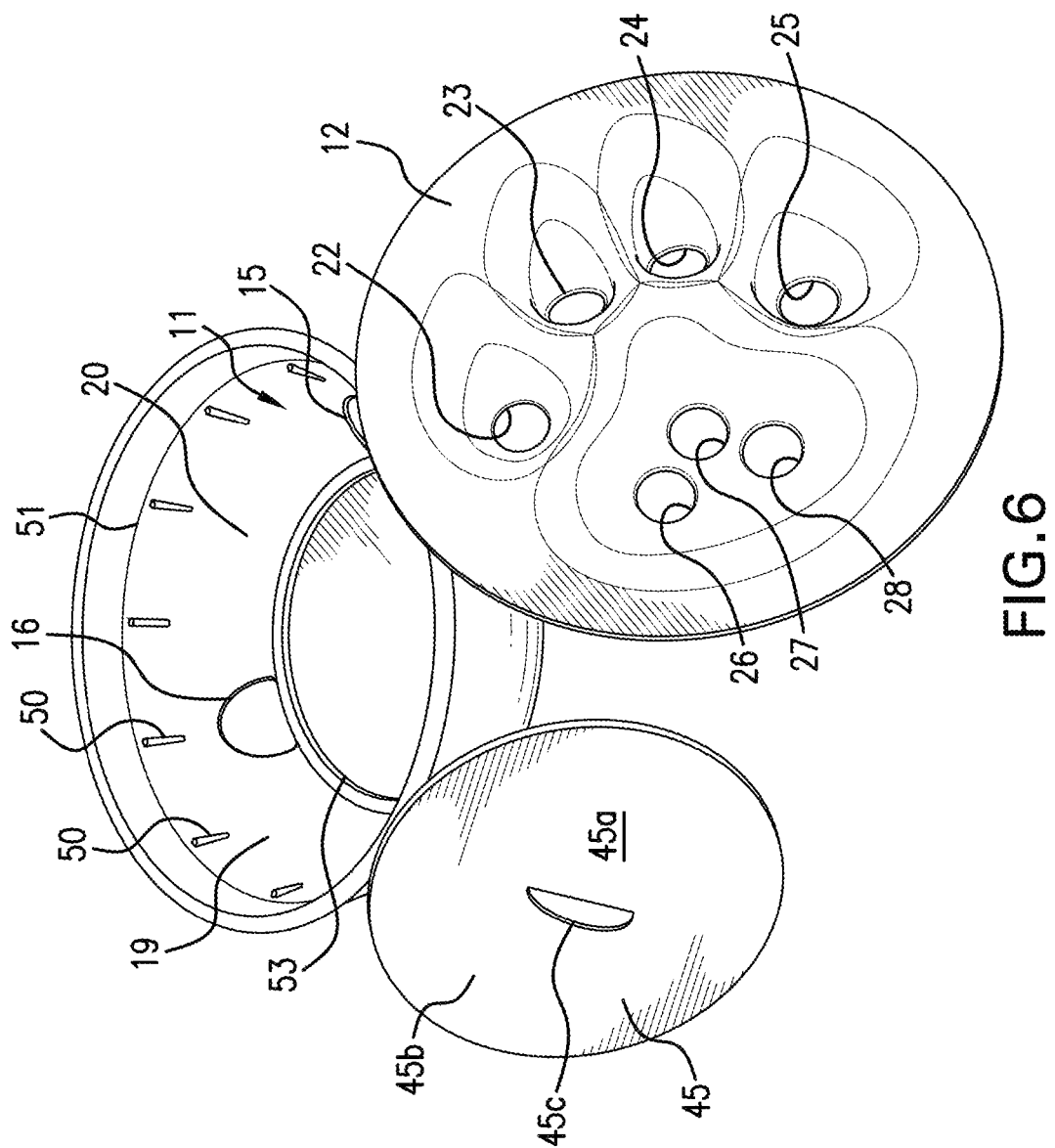
FIG. 6 is another perspective view of the device of FIG. 1, showing the components in an unassembled condition arranged in a different position, against the body.
Figure 7:
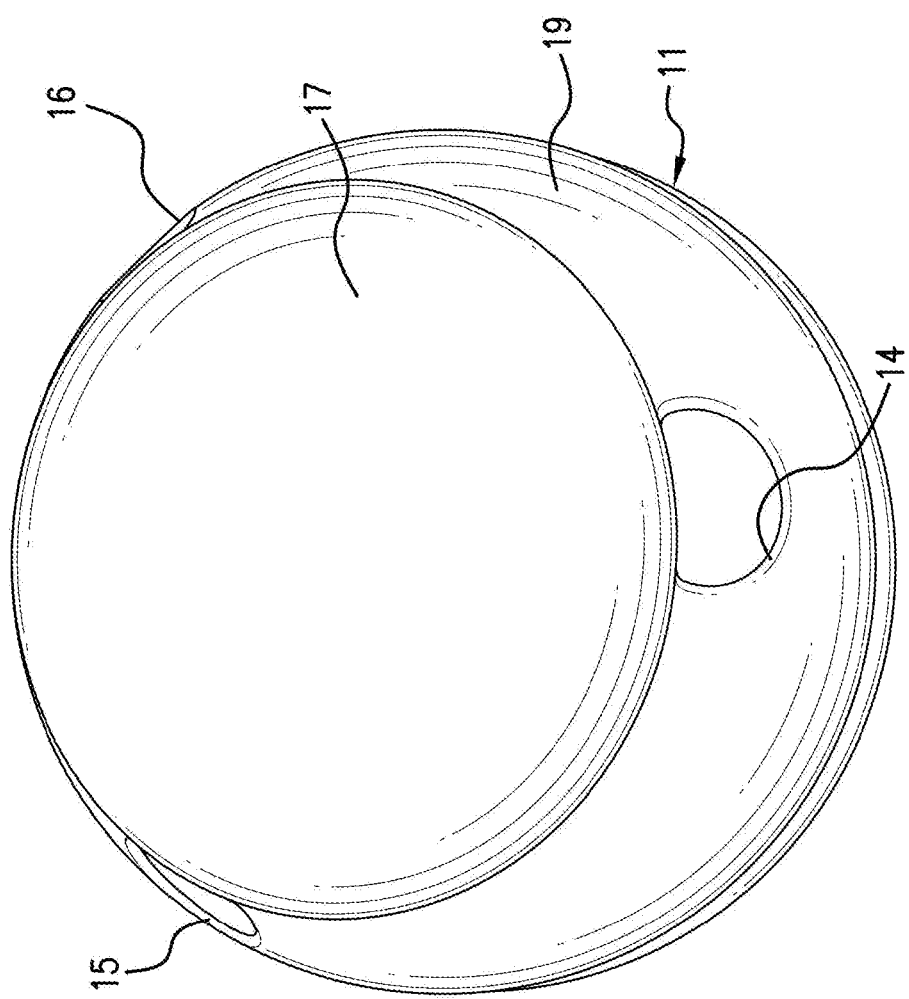
FIG. 7 is a perspective view looking at the bottom of the device body of the device of FIG. 1.
Figure 8:
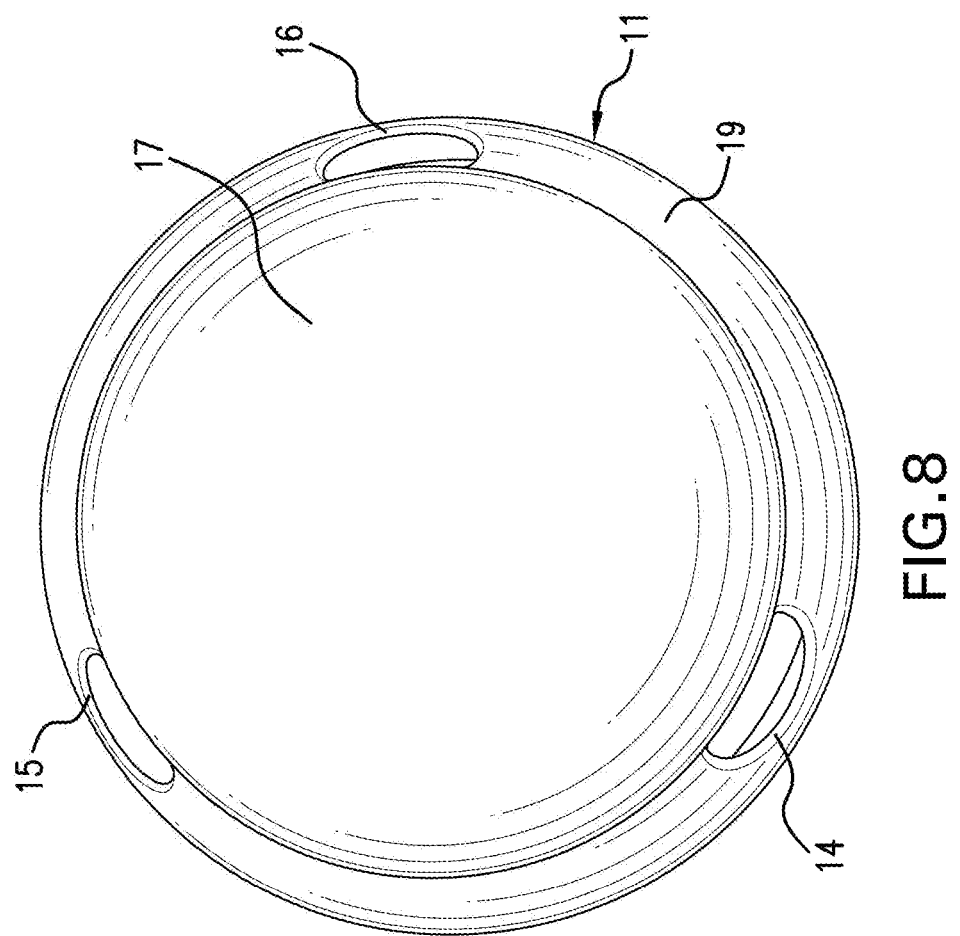
FIG. 8 is a bottom plan view of the device of FIG. 1.
Figure 9:
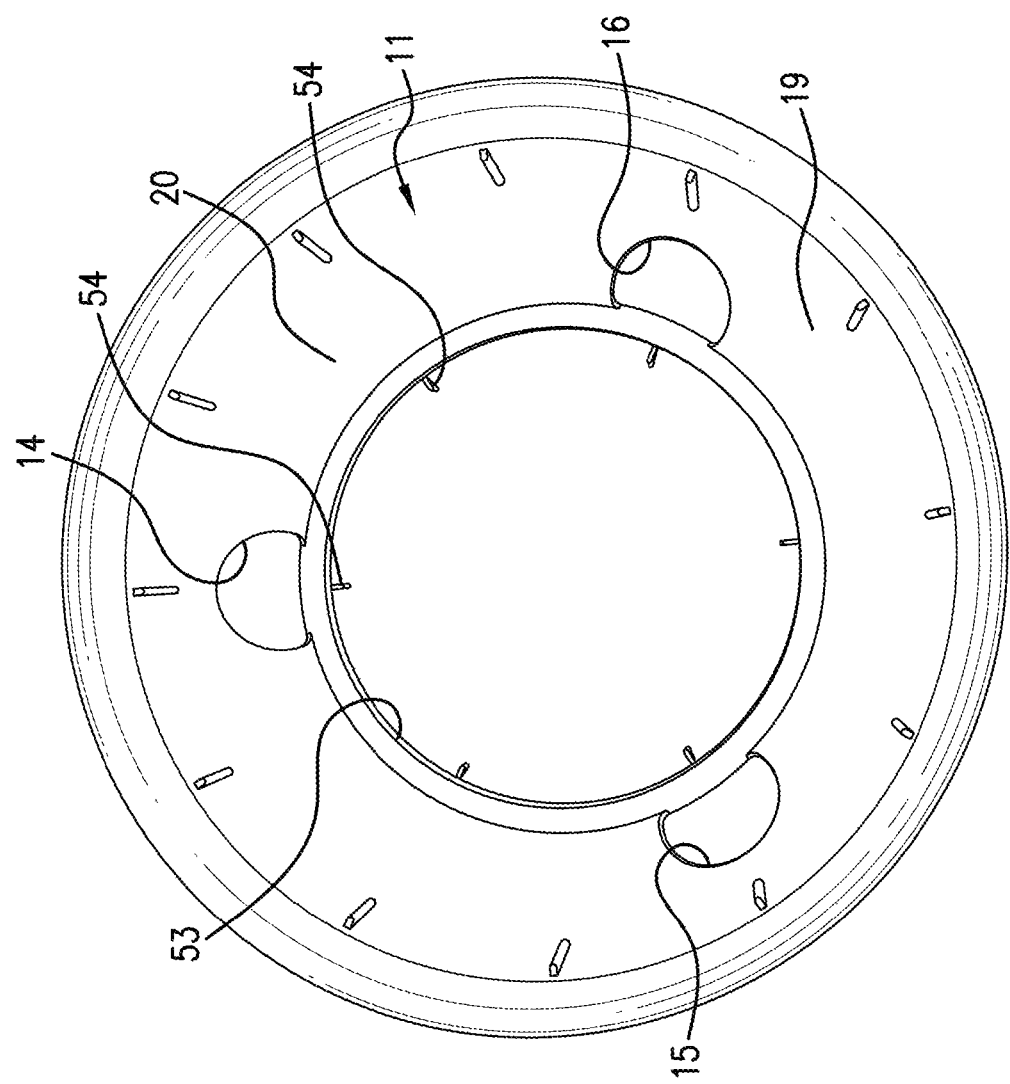
FIG. 9 is a top plan view of the device body of the device of FIG. 1, shown separately from the other components.
Figure 10:
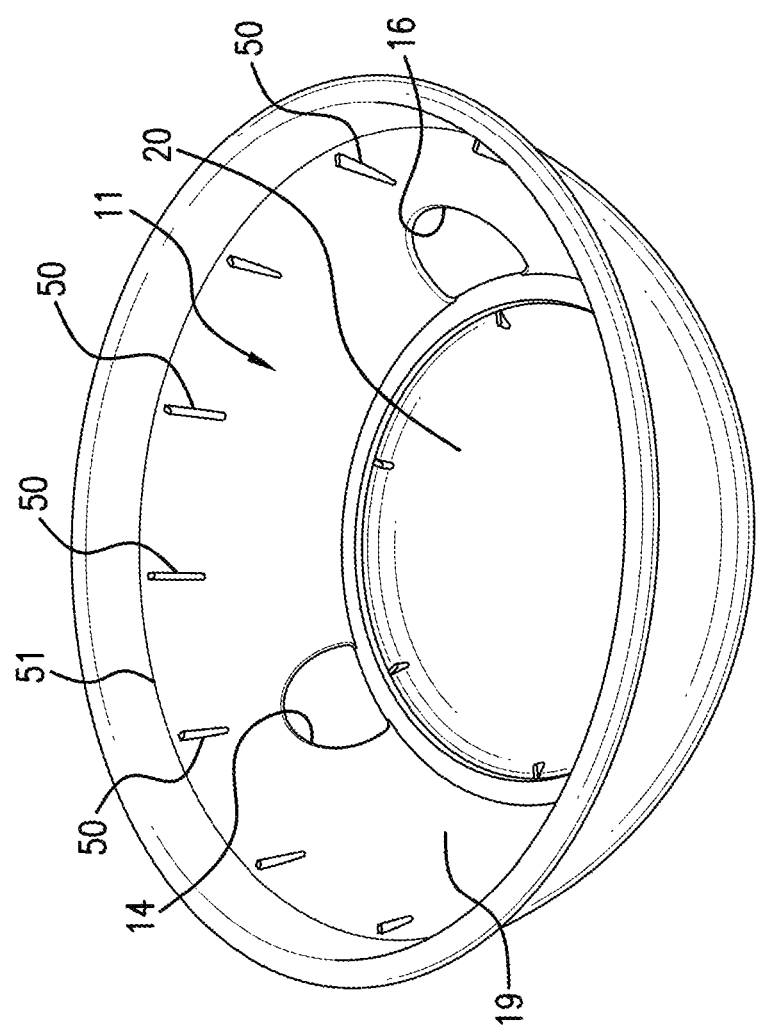
FIG. 10 is a perspective view of the device body of the device of FIG. 1, shown separately from the other components.

According to preferred embodiments, the upper surface portion 12 preferably is removably attachable to the body 11, and facilitates cleaning of the device 10 (which may be done by hand or by placing the device in a dishwasher). FIGS. 5 and 6 show the upper surface portion 12 removed from the device body 11. As shown best in FIGS. 9 and 10, the body 11 preferably includes a one or more positioning elements, such as, for example, a ledge, ledge portion, or other elements, on which the surface portion 12 may be seated. The device 10 preferably has a supporting structure for supporting the upper surface portion 12. The supporting structure is shown in FIGS. 9 and 10 according to an exemplary embodiment comprising a plurality of support elements 50 and an annular ridge 51. The upper surface portion 12 may be fitted into a secure position on the device body 11 against the elements 50 and secured to engage the ridge 51. Alternative securing configurations may be provided to secure the upper surface portion 12 to the body 11. When installed on the body 11 within the bowl space, the upper surface portion 12 remains substantially fixed in position. Although the upper surface portion 12 is shown being installed on the body 11 using a press-fit or friction fit connection, other suitable attachment means may be used, including twist mount, bayonet, screw threads, tabs and the like.

The body 11 is shown having a wall 19. The wall 19 may form the body 11, and may be a continuous wall 19, or may include separate wall portions that are molded, assembled or otherwise joined together. Openings 14, 15, 16 are provided in the body wall 19. The openings 14, 15, 16 preferably are sized to provide a suitable exit port for contents, such as food, to exit the device 10 from the cavity 20.

Figure 4:
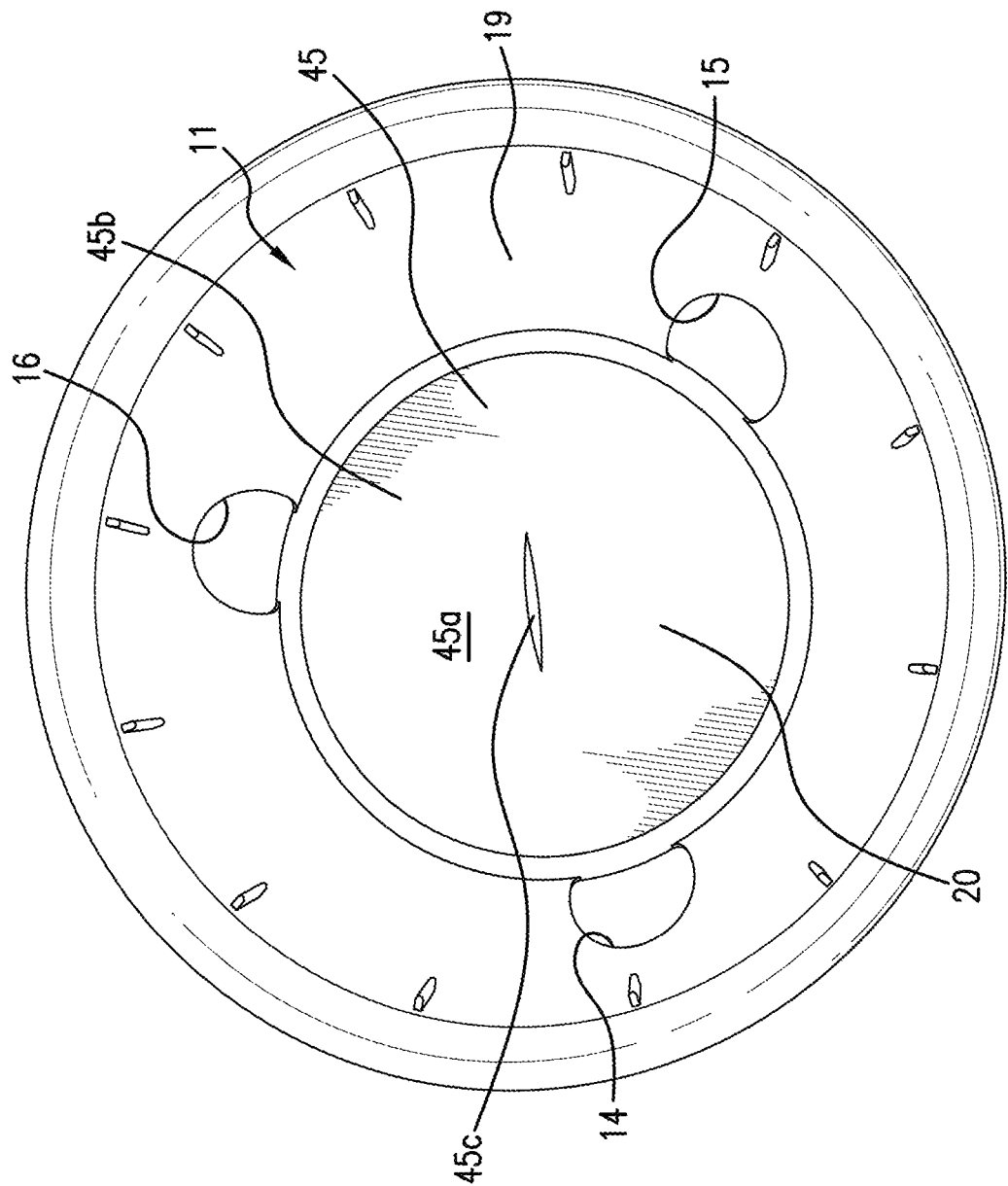
FIG. 4 is a top plan view of the device of FIG. 1, with the body and lower plate shown separately from the upper surface, which is removed from the body in this view.

The device 10 has a floor 45a disposed at a suitable position for supporting food thereon that has passed into the cavity 20, and, preferably is provided at a level to facilitate passage of the food through the one or more openings 14, 15, 16. The device floor 45a is shown at the bottom of the cavity 20. According to preferred embodiments, the cavity 20 may be configured for size using an insert, such as, for example, the bottom plate insert 45 which, in FIG. 4, is shown installed on the body 11 and comprising the cavity floor 45a. According to some embodiments, the insert 45 may be fixedly attached to the bottom of the body 11, and according to other embodiments, the inert 45 may be removably attached to the body 11. The insert 45 is shown removed from the body 11 in FIGS. 5 and 6, and the body 11 is shown in FIGS. 5, 6, 9, and 10 without the insert 45. The insert 45, as illustrated, provides a floor 45a, which may comprise a false floor of the device 10 and cavity 20, and which reduces the cavity 20. The outlet openings 14, 15, 16 are shown provided in the wall 19 of the body 11. The outlet openings 14, 15, 16 are shown disposed above the convex bottom portion 17 so that the openings 14, 15, 16 are accessible when the device 10 is tipped (e.g., when an animal is playing with it). Although, according to preferred embodiments, the bottom plate insert 45 is shown having a flat or substantially flat surface 45b forming the floor 45a, the plate insert 45 may be provided having other configurations (e.g., bowed, convex, concave, and the like). In addition, a tab, such as the tab 45c may be provided to facilitate removal of the bottom by gripping. Alternatively, according to other embodiments, the bottom insert 45 may be fixedly mounted and sealed to prevent entry of water, food or other debris into the space covered by the insert 45. Alternatively, the insert 45 or floor surface 45a may be shaped to control the release of food. The floor 45 or surface 45a may be shaped to direct more or less food through the openings 14, 15, 16 when the device 10 is tilted. For example, the floor 45a or insert 45 may be crowned, bowed, etc.

According to a preferred embodiment, a lower annular ridge 53 is provided on the body 11 to facilitate mounting of the floor or insert 45 thereon. The annular ridge 53 may lock with an annular groove (not shown) provided on the insert 45, or secure the floor insert 45 by another suitable attachment configuration. Support elements 54 may be provided on the bottom interior of the body 11 for supporting the floor insert 45 thereon.

As illustrated according to an exemplary embodiment, the floor 45a preferably is provided at a height that corresponds with the bottom of the openings 14, 15, 16. Although, according to the preferred embodiment illustrated, the openings 14, 15, 16 preferably are located at the same height and are depicted being disposed at equally spaced apart locations around the body perimeter, openings may be provided having different sizes and configurations, including relative to each other, and may be provided at different locations on the body wall 19, and in different numbers. For example, other embodiments of the device 11 may be constructed with fewer or greater numbers of openings than those openings 14, 15, 16 shown.

According to an alternate embodiment, one or more passageways are provided in the upper surface portion 12. The upper surface portion 12 may be constructed to be flat or substantially flat, or have one or more flat areas. As illustrated in the embodiment shown, the upper surface portion 12 includes one or more flat areas. As shown in the drawings, the upper surface portion 12 forms a bowl area 60 with the wall 19 of the body 11. Edible items, such as animal food, are dispensed into the bowl area 60 of the device 10, and onto the upper surface portion 12. This typically is done by an individual, such as the person or caretaker in charge of feeding or caring for the animal. According to preferred embodiments, the bowl area 60 preferably is configured to hold a suitable amount of food for a single feeding for an animal. For example, the bowl area 60 may be sized to hold up to four cups of dry dog food (suitable for an entire meal or feeding). Some food may fall through the apertures 22, 23, 24, 25, 26, 27, 28, while most of the food will remain within the bowl area 60 supported on the upper surface portion 12. The apertures 22, 23, 24, 25, 26, 27, 28 may be provided having different sizes other than those shown. For example, alternative upper surface portions may be provided having different sizes and/or numbers of apertures, so that the openings are suitable for odd or unusually larger or smaller foods. However, the apertures 22, 23, 24, 25, 26, 27, 28 preferably are provided to handle a majority of foods, even smaller and larger foods. The configuration of the upper surface portion 12 may hold food that is much smaller than the apertures since the food will collect together and not fall through until a suitable disturbance occurs (which is the pet feeding from the bowl area 60 of the device 10, or is otherwise moving or agitating the device 10).

According to some embodiments, the device 10 may be constructed to provide different levels of difficulty for dispensing of the food from the device 10. The difficulty level may be controlled to vary the challenge presented to the animal using the device 10. The device 10 may be provided with a preset level of difficulty, or alternatively, may be adjustable (e.g., by interchanging or inserting components) to provide different levels of difficulty. For example, according to some alternate embodiments, the device 10 may be configured with an internal construction that provides a restriction for the food to pass from the bowl area 60 (through the passages in the upper surface portion 12) and out of the bowl body 11 through the passages 14, 15, 16 in the body wall 19. A structure may be located in the internal cavity 20 to control the ease or difficulty of the food release from the device 10. According to some embodiments, the floor 45 may be configured to control the difficulty or ease of the food passage. According to some embodiments, a structure comprising one or more restrictive elements may be provided in the internal cavity 20. The structure may be implemented as an internal tray or insert disposed between the upper surface portion 12 and the floor insert 45 (or the interior of the body bottom portion 17 when no floor insert is used). Embodiments may provide structure within the cavity 20 to restrict the passage of food by presenting an obstacle that the food may engage when the device 10 is agitated by an animal. The structure may be removably provided within the cavity 20, and, for example, according to some embodiments, may be provided as part of or in place of, or to connect with, a floor insert, such as the floor insert 45. Alternatively, the restricting structure may be provided as part of or to connect with, or in place of, the upper surface portion, such as the upper surface portion 12. According to some embodiments, a restricting structure, such as, for example, an insert, may be detachably provided for installation on the bowl body 11, and may be interchangeably provided with one or more optional alternately configured inserts (or floors and/or upper surface portions containing a restricting structure) that have different levels of obstruction or interference to control the level of restriction of the food passage.

FIGS. 11 to 18 illustrate some examples of restrictive structure provided in the device cavity 20. In the embodiments illustrated, the inserts may be removably installed in the device cavity, and preferably may be held by the tab 45c of the floor insert 45.

Referring to FIGS. 11 and 12, an alternate embodiment of a restrictive structure is illustrated comprising an insert 145. The insert 145 may be used with the floor insert 45, and, according to the exemplary embodiment depicted, may be separately provided. (According to other embodiments, an insert, such as the insert 145, may be configured to be used in place of the floor insert 45.) The restrictive insert 145 is shown connecting to the floor insert 45. For example, the tab 45*c* of the floor insert 45 may be keyed to fit the slot 146 of the insert 145. The insert 145 may be provided to seat above the floor insert 45, so that a sub cavity or space is formed between the floor insert 45 and the restrictive insert 145. In the embodiment illustrated, the insert 145 is shown having passages 147, 148, 149 therein that permit food to pass, and recessed portions 151, 152, 153 are also shown disposed in the periphery (that allow for food passage). A surface 160 of the restrictive insert 145 provides an area for food to collect or rest and impedes the passage of the food as the food makes its way from the upper plate or surface 12 to the exit openings 14, 15, 16 provided in the device body wall 19. The plate 145 is shown having edges 161, 162, 163 which may be supported on the interior of the body 11, and, according to some embodiments, may be seated on a ledge or other support (not shown) provided on the interior of the body wall 19. The insert 145 is shown having a plurality of passages, and represents an exemplary embodiment. However, the insert 145 may be configured with different sizes and shapes of openings to ease or make more difficult food passage through the device 10.

Referring to FIGS. 13 and 14, another alternate embodiment of a restrictive insert 245 is depicted, shown having a surface 260 with a key slot 246 therein and a plurality of restrictive elements which are illustrated comprising upstanding walls 247, 248, 249. In the embodiment illustrated, the elements or walls 247, 248, 249 project upwardly from the insert surface 260 and are spaced apart. The insert 245 may be installed as discussed herein in connection with the insert 145, with the key slot 246 being seated on the tab 45*c*.

Referring to FIGS. 15 and 16, another alternate embodiment of a restrictive insert 345 is shown. The insert 345 has a key slot 346 in the insert surface 360. The restrictive structure is shown comprising restrictive elements that include a first wall 347 and second wall 348. The first and second walls, 347, 348, respectively, in the embodiment illustrated, project upwardly from the insert surface 360 and are circumferentially configured. The first wall 347 is shown having a plurality of passages therein which comprise apertures 351, 352, 353. The second wall 348, which is an inner wall relative to the first wall 347, has passages therein which comprise apertures 354, 355, 356. The inert 345 is shown having two additional subcavities 365, 366, formed by the walls 347, 348, to provide collecting areas for the food as it encounters the restrictions during agitation of the device 10 by the animal. Although the insert 345 is shown as a single component, the insert 345 may be configured to comprise a plurality of component portions, for example, where the inner wall 348 has its own base (not shown) and where that inner wall base has a matingly aligned key slot therein (which aligns with the key slot 346) and where that base rests on the surface 360 (e.g., a stacked arrangement). In this configuration, the key, such as the tab 45*c* or other tab of the device bottom 17, therefore may hold both component portions. Alternatively, one or both component portions may be used.

Figure 17:
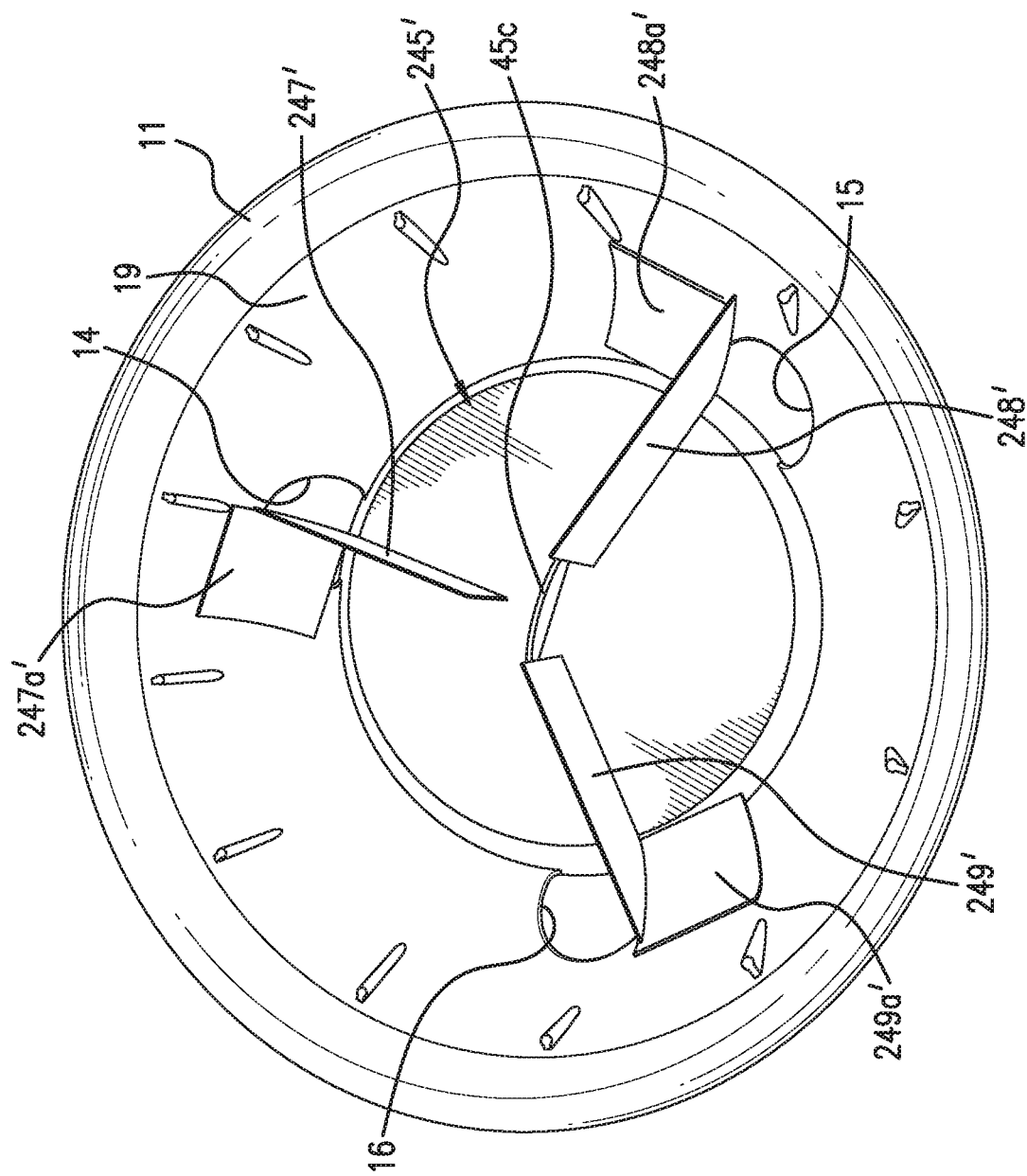
FIG. 17 is a perspective view looking down on the device from the top, showing the device of FIG. 1, with the upper plate removed, and with another embodiment of an insert installed.

Referring to FIG. 17, a perspective view of the interior of the device body 11 is shown with another embodiment of a restrictive insert or tray 245' having a configuration similar to the insert 245 of FIGS. 13 and 14. The insert 245' is shown in FIG. 17 installed on the floor insert 45 with the floor insert tab 45*c* passing through the key slot 246' of the insert 245'. The upstanding walls 247', 248', 249' are shown having arms 247*a*', 248*a*', 249*a*' extending therefrom near or engaging the interior wall 19 of the device body 11 (preferably, in the cavity 20 below the upper plate 12 location). Although not shown, the insert 245' (and any of the other floor inserts or trays) may have further retaining structured or bracing, such as a support (extending near or to the upper surface 12) to prevent inadvertent unseating off of the key tab 45*c*. Referring to FIG. 18, another alternate embodiment is illustrated, where the device 10 is shown with an insert 345' similar to the insert 345 shown in FIGS. 15 and 16. The insert 345' has a floor or surface 360' with a key slot 346', inner and outer upstanding walls 347', 348', respectively, with passages 354', 355', 356' in the second or inner wall 348', and passages 351', 352', 353', in the first or outer wall 347'. The key tab 45*c* may friction fit within a key slot to hold an insert to the device 10.

In the embodiments illustrated, the restrictive structure, such as, for example, the inserts 145, 245, 345, 245', 345', may be installed and/or removed and interchanged to provide an alternate or desired level of challenge for the animal by easing or making more difficult the restriction of the food delivery from the device 10.

Although the inserts 145, 245, 345, 245', and 345' in the respective exemplary embodiments depicted in FIGS. 11-18 are shown used with the floor insert 45 and tab 45*c* thereof, according to some alternate embodiments, the floor insert 45 may be configured similar to those inserts 145, 245, 345, 245', 345' and the inserts 145, 245, 345, 245', 345' may be provided to replace the floor insert 45 and provide a floor similar to the floor surface 45*a*, with the restrictive structures and/or one or more additional floor surfaces (e.g., 160, 260, 360, 260', 360'), which according to some embodiments, may be formed as part of a floor insert.

According to some embodiments, the restricting structure, such as inserts or components containing restrictive elements, may be removably provided and a plurality of differently constructed shapes and restrictions, may be installed, removed and interchanged to control the level of restriction (for example, with some having little or no restriction, and others having a great deal of restriction). The device 10 and the components, including the upper plate, floors, inserts, and restrictive elements are preferably washable, and dishwasher safe. Controlling the restriction level enables a user to increase or decrease the difficulty of the device and regulate the challenge presented to the animal. For example, according to some embodiments, the user may configure the device 10 to use the top tray (the upper surface portion 12) and main cavity 20 together. The device 10 may be configured to provide different levels of difficulty for food release, from a configuration where an inner tray or floor (within the cavity 20), such as the floor surface 45*a* of the floor insert 45, is flat and therefore easier for food to exit the openings 14, 15, 16, or where there is no floor insert 45 or inner tray, which presents medium difficulty, or where the device 10 is configured to have a highly featured restrictive structure (such as a highly featured inner tray or insert which may look like a maze or have "walls" protruding upwards) which makes it very difficult to remove food (see, for example, the insert or inner tray structures shown in FIGS. 11-18). The restricting structure, such as an insert or tray, may be integrated with the device 10, or preferably, may be provided separately and subsequently installed on the device 10, as desired. The interior structure (such as a floor or tray insert) may be provided as a kit that contains a plurality of different configurations (e.g., different trays, floors, inserts or restrictive elements or combinations thereof) corresponding to different levels of difficulty for food passage. According to some embodiments, the user may select a configuration of interchangeable/removable structures at any desired time of use of the device 10.

The device preferably is produced from any suitable material that may be washed. Preferred materials include rigid, structural plastic. According to preferred embodiments, the device bottom preferably is a tacky, grippy material. A number of suitable materials may be used to produce the device.

The device may be produced by any suitable production process. According to some preferred embodiments, the device may be produced by injection molding. Pellet form thermoplastic elastomers may be used, and injection molded using a suitable molding apparatus to form the device. Alternatively, one or more components of the device may be separately produced, including by injection molding or other suitable process, and assembled together to produce the device. For example, a two-shot injection mold process may be used to produce the device, so as to form the bottom sticky portion which may be different than the material used for the remainder or other portions of the device or bowl. The two-shot injection molding may involve injection of two dissimilar materials into a single mold cavity in order to Balm the device. The two-shot molding may also be utilized to produce the device in a consistent and repeatable manner. Alternatively, an over-mold process may be utilized to product the device, where the device or portion thereof is created and in a second step the portion, such as the bottom tacky portion, is overmolded onto the other portion of the device. For example, overmolding may be used to produce the device, wherein the main bowl cavity, made of a rigid plastic, is first formed, and then released from the mold, and next inserted into another mold, wherein the second, dissimilar polymer (e.g., the tacky substance forming the bottom portion) is injected onto and around the first part. Other methods may include attaching or adhering a layer of a tacky substance on the bottom exterior of the bowl, or providing a tacky coating layer thereon, by spraying, immersion or other suitable step. Another alternative method for producing the bowl device is using an assembly process wherein two dissimilar materials are molded into their respective parts separately, and then attached permanently together via adhesive, heat, ultrasonic welding, spin welding, or any other assembly method. In addition, although the materials discussed mention two dissimilar materials or a first and second material, other numbers of materials may be used in the processes described, such as, for example, for color variation, texture, or other properties. Injection molding, view a two-step process or overmolding comprise preferred methods for producing the devices according to the invention.

The devices disclosed herein also may be decorated and provided with logos. For example, one or more post-treatment processes may be applied. For example, wherein the device or part thereof part is made of one material, it may be modified afterwards, via painting, spraying, etching, or the like.

The material from which the device is produced, including thermoplastic elastomers, preferably are durable to withstand use and cleaning, and also preferably are free of lead, PVC, latex, phthalates and metals. (The exclusion of metals refers namely to harmful metals being present, as, according to some alternate embodiments, the device, in whole or part, may be constructed from metal, such as stainless steel). Although other materials may be used, such as, for example, thermoset rubber, this material is likely to contain latex, which is undesired in many instances, since latex has in some reported cases, caused allergic reactions.

These and other advantages may be obtained through the use of the inventive apparatus and methods disclosed herein. While the invention has been described with reference to specific embodiments, the description is illustrative and is not to be construed as limiting the scope of the invention. Various modifications and changes may occur to those skilled in the art without departing from the spirit and scope of the invention described herein and as set forth in the appended claims.

What is claimed is:

1. An enrichment device for dispensing edible food products to an animal comprising:
  a body comprising a cavity, a convex bottom portion that forms a closed bottom end of the cavity, a top edge that surrounds an open top end of the cavity, and a wall extending from the convex bottom portion to the top edge, the wall having an inner surface that faces the cavity and an outer surface opposite the inner surface;
  an upper surface portion positioned within the cavity, the upper surface portion having a top surface and a bottom surface opposite the top surface, the bottom surface facing and spaced apart from the closed bottom end of the cavity and the top surface being recessed relative to the top edge of the body so that a bowl area into which edible food products that form a meal are placed is formed between the top surface of the upper surface portion and the top edge of the body, the top surface of the upper surface portion forming a floor of the bowl area;
  a plurality of depressions in the top surface of the upper surface portion;
  a plurality of apertures in said upper surface portion, at least one of the apertures being located within each of the depressions, each of the apertures forming a passageway from the bowl area to a portion of the cavity located between the upper surface portion and the closed bottom end of the cavity, wherein each of the apertures has a size that permits the edible food products to fall from the bowl area into the portion of the cavity; and
  one or more openings in the wall of the body extending from the inner surface of the wall to the outer surface of the wall, each of the openings forming a passageway from the portion of the cavity to an exterior of the body, wherein each of the openings is sized to allow all of the edible food products that are located in the portion of the cavity to be dispensed to the exterior of the body.

2. The enrichment device of claim 1, wherein the convex bottom portion of the body is configured to support the device on a support surface and is shaped to displace the device when the device is disrupted.

3. The enrichment device of claim 2, wherein the convex bottom portion is configured so that said device rocks or sways when disrupted.

4. The device of claim 3, wherein said convex bottom portion is rounded.

5. The device of claim 3, wherein said convex bottom portion comprises a thermoplastic elastomer that provides suitable friction to reduce or prevent sliding.

6. The device of claim 1, wherein the body has a floor defining a bottom surface of said cavity, the bottom surface of the upper surface portion being spaced apart from the floor of the body.

7. The device of claim 6, wherein said one or more openings in the wall are disposed above said floor of the body.

8. The device of claim 6, wherein said floor of the body comprises a plurality of elements projecting into the cavity.

9. The device of claim 8, wherein the floor of the body is removable.

10. The device of claim 6, further comprising a restrictive insert removably positionable within the cavity, wherein said restrictive insert has apertures therein, and wherein a sub cavity is formed between the restrictive insert and the bottom surface of said cavity.

11. The device of claim 1, wherein said upper surface portion is detachably coupled to said body, the body comprising a plurality of support elements protruding from the inner surface of the wall for supporting the upper surface portion in the cavity.

12. The device of claim 1, further comprising a bottom plate insert positioned within the cavity of the body, a flat top surface of the bottom plate insert forming a false floor of said cavity, the bottom plate insert comprising a tab extending from the flat top surface and into the cavity to facilitate removal of the bottom plate insert by a user gripping the tab.

13. The device of claim 1, wherein the plurality of depressions comprises five depressions that collectively form a paw print configuration.

14. The device of claim 13, wherein the plurality of depressions comprises one large depression having a first size and four small depressions having a second size, wherein the first size has an area that is greater than the second size, and wherein there are at least two of the apertures formed in the large depression and exactly one of the apertures formed in each of the small depressions.

15. The device of claim 1, wherein said one or more openings in the wall of the body consists of exactly three openings that are equispaced along the body.

16. The device of claim 1, wherein said device is constructed from food grade materials.

17. The device of claim 1, wherein said body is constructed from one or more thermoplastic elastomers.

18. The device of claim 1, where the bowl area is configured to hold a suitable amount of the edible food product for a single feeding of an animal, most of the edible food being supported on the top surface of the upper surface portion and a remainder of the edible food product falling through the apertures and into the portion of the cavity.

19. The device of claim 1, further comprising a restrictive insert located in the cavity to control the ease or difficulty of food release from the device.

20. The device of claim 19, wherein said body has a floor defining the closed bottom end of said cavity, and wherein the restrictive insert is provided on one or more of the floor of the body, the upper surface portion, or a bottom plate insert removably installable between said upper surface portion and said floor of the body.

21. The device of claim 19, wherein said restrictive insert is installed on the device to regulate the level of difficulty of food passage.

22. The device of claim 21, wherein said restrictive insert is selected from a plurality of restrictive inserts that are configured to be detachably coupled to the body.

23. The device of claim 19, wherein said restrictive insert is connected to the upper surface portion.

24. The device of claim 19 wherein said restrictive insert is connected to a floor of the body.

25. The device of claim 19, including means for removably securing the restrictive insert to the body or to a bottom plate insert that is coupled to the body.

26. The device of claim 25, wherein said means for removably securing the restrictive insert to the body or to the bottom plate insert comprises a key slot provided in the restrictive insert, and a key provided on an interior of a floor of the cavity.

27. The device of claim 19, wherein said restrictive insert comprises a restrictor having a predetermined level of restriction.

28. The device of claim 19, wherein a plurality of the restrictive inserts are provided, and wherein each restrictive insert of the plurality of restrictive inserts alone or in combination with another one of the plurality of restrictive inserts, controls the level of restriction.

29. The device of claim 19, wherein said restrictive insert comprises a plurality of restrictions, and wherein said restrictions comprise upstanding walls.

30. The device of claim 29, wherein said upstanding walls have apertures therein.

31. The device of claim 30, wherein said plurality of upstanding walls include at least one first wall and at least one second wall, and wherein said upstanding walls are concentric.

32. The device of claim 31, wherein the apertures of said first wall are staggered in relation to the apertures of said second wall.

33. The device of claim 19, wherein said restrictive insert comprises a plurality of restrictions, and wherein said restrictions comprise projections that extend into the cavity.

34. The device of claim 1, wherein the body comprises a floor having at least one restriction.

35. The device of claim 1, further comprising a bottom plate insert removably installable at a bottom of said cavity, and a restrictive insert removably installable at a location in the cavity between said bottom plate insert and said upper surface portion.

36. The device according to claim 35, wherein said bottom plate insert comprises a top surface that defines a floor of the cavity, a tab protruding from the top surface of the bottom plate insert, wherein the restrictive insert comprises a slot, and wherein the restrictive insert is positioned in the cavity so that the tab of the bottom plate insert extends into the slot of the restrictive insert.

37. An enrichment device for dispensing edible food products to an animal comprising:
 a body having an inner surface that defines a cavity having a closed bottom end and an open top end, the body having a floor and a sidewall that collectively define the cavity, a plurality of openings formed into the sidewall of the body;
 an upper surface portion positioned within the cavity and detachably coupled to the body, the upper surface portion comprising a top surface that is recessed relative to a top edge of the sidewall so that a bowl area into which edible food products are placed is formed between the top surface of the upper surface portion and the open top end of the cavity, the top surface of the upper surface portion having a plurality of depressions formed therein and an aperture formed into at least one of the plurality of depressions that forms a passageway from the bowl area into a portion of the cavity located between the upper surface portion and the closed bottom end of the cavity;

wherein the aperture is sized to allow the edible food products to fall from the bowl area into the portion of the cavity; and wherein each of the openings in the body is sized to allow the edible food products to be dispensed from the portion of the cavity to exit the body.

38. The enrichment device according to claim 37 further comprising a bottom plate insert positioned within the body and forming a floor of the cavity, wherein the bottom plate insert is detachably coupled to the body.

39. The enrichment device according to claim 37 wherein the plurality of depressions in the upper surface portion collectively form an animal paw configuration.

\* \* \* \* \*